(12) United States Patent
Blagodurov et al.

(10) Patent No.: US 11,914,517 B2
(45) Date of Patent: Feb. 27, 2024

(54) METHOD AND APPARATUS FOR MONITORING MEMORY ACCESS TRAFFIC (71) Applicant: Advanced Micro Devices, Inc., Santa Clara, CA (US)

(72) Inventors: Sergey Blagodurov, Seattle, WA (US); Marko Scrbak, Austin, TX (US); Brandon K. Potter, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 63 days.

(21) Appl. No.: 17/094,989

(22) Filed: Nov. 11, 2020

(65) Prior Publication Data

US 2022/0100668 A1 Mar. 31, 2022

Related U.S. Application Data

(60) Provisional application No. 63/083,483, filed on Sep. 25, 2020.

(51) Int. Cl.
*G06F 12/08* (2016.01)
*G06F 12/0877* (2016.01)
*G06F 12/0815* (2016.01)

(52) U.S. Cl.
CPC ...... *G06F 12/0877* (2013.01); *G06F 12/0815* (2013.01); *G06F 2212/621* (2013.01)

(58) Field of Classification Search
CPC ............ G06F 12/0877; G06F 12/0815; G06F 12/082; G06F 12/0828; G06F 12/08; G06F 2212/621
See application file for complete search history.

(56) References Cited

U.S. PATENT DOCUMENTS

| 7,096,323 B1 | 8/2006 | Conway et al. |
| 7,155,572 B2 | 12/2006 | Hughes et al. |
| 7,334,102 B1 | 2/2008 | Conway |
| 10,248,325 B2 * | 4/2019 | Blankenship ....... G06F 12/0808 |

(Continued)

FOREIGN PATENT DOCUMENTS

| WO | WO-2004029776 A2 * | 4/2004 | ........... G06F 12/082 |
| WO | WO-2014004111 A1 * | 1/2014 | ........... G06F 11/004 |
| WO | WO-2020021791 A1 * | 1/2020 | ......... G06F 12/0238 |

OTHER PUBLICATIONS

A. Nowatzyk, G. Aybay, M. Browne, E. Kelly, D. Lee and M. Parkin, "The S3.mp scalable shared memory multiprocessor," 1994 Proceedings of the Twenty-Seventh Hawaii International Conference on System Sciences, Wailea, HI, USA, 1994, pp. 144-153.*

(Continued)

*Primary Examiner* — Pierre Michel Bataille (57) ABSTRACT

Methods and apparatus provide monitoring of memory access traffic in a data processing system by tracking, such as by data fabric hardware control logic, a number of cache line accesses to a page of memory associated with one or more memory devices, and producing spike indication data that indicates a spike in cache line accesses to a given page of memory. Pages are moved from a slower memory to a faster memory based on the spike indication data. In some implementations, the tracking is done by updating a cache directory with data representing the tracked number of cache line accesses.

20 Claims, 7 Drawing Sheets

(56) References Cited

U.S. PATENT DOCUMENTS

| | | | |
|---|---|---|---|
| 10,534,687 B2* | 1/2020 | Fahim | G06F 11/1446 |
| 10,761,986 B2* | 9/2020 | Blagodurov | G06F 3/0629 |
| 11,467,992 B1* | 10/2022 | Kaplan | G06F 3/0673 |
| 2005/0081015 A1 | 4/2005 | Barry | |
| 2007/0038840 A1 | 2/2007 | Hummel et al. | |
| 2008/0114930 A1* | 5/2008 | Sanvido | G06F 12/0866 |
| | | | 711/E12.019 |
| 2009/0328074 A1 | 12/2009 | Oshins | |
| 2010/0005248 A1 | 1/2010 | Cheng et al. | |
| 2011/0161620 A1 | 6/2011 | Kaminski et al. | |
| 2011/0307644 A1* | 12/2011 | Cho | G06F 3/0689 |
| | | | 711/170 |
| 2015/0032964 A1 | 1/2015 | Habermann et al. | |
| 2017/0185518 A1* | 6/2017 | Guim Bernet | G06F 12/0817 |
| 2017/0351611 A1* | 12/2017 | Ash | G06F 12/084 |
| 2018/0232310 A1 | 8/2018 | Chang et al. | |
| 2020/0125490 A1* | 4/2020 | Blagodurov | G06F 3/061 |
| 2021/0191879 A1* | 6/2021 | Arora | G06F 11/3024 |
| 2022/0100655 A1* | 3/2022 | Seningen | G06F 12/0802 |

OTHER PUBLICATIONS

Gen-Z Consortium; "DRAM and Storage-Class Memory (SCM) Overview"; white paper, 2016; 7 pages.

\* cited by examiner

METHOD AND APPARATUS FOR MONITORING MEMORY ACCESS TRAFFIC

RELATED APPLICATIONS

This application claims priority to Provisional Application Ser. No. 63/083,483, filed on Sep. 25, 2020, having inventors Sergey Blagodurov et al., titled "METHOD AND APPARATUS FOR MONITORING MEMORY ACCESS TRAFFIC", and is incorporated herein by reference.

BACKGROUND OF THE DISCLOSURE

Memory controllers are circuits that translate accesses generated by a memory accessing agent such as a data processor into one or more commands that are understood by computer memory. A memory controller can be implemented as a separate chip or integrated with other components such as data processors on a single integrated circuit chip. In the latter case, the memory controller is usually called an integrated memory controller. Typical integrated memory controllers support the double data rate dynamic random-access memory (DDR DRAM) bus protocol, but support only pre-existing DDR DRAM devices or devices that operate like them. The need for tight coupling of memory with computing resources like central processing units (CPUs), graphics processing units (GPUs), digital signal processors (DPSs), and the like pose challenges to the system designer related to memory capacity requirements, memory controller availability, memory lifecycle limitations, and memory bandwidth availability to CPUs. Capabilities such as in-memory workloads and server virtualization drive the need for increasing memory capacity. Moreover, the increasing performance of CPUs creates a need for more memory channels per socket. For example, memory capacity requirements are driven by the number of CPUs in order to maintain balanced computational resources for many workloads. Furthermore, lifecycles of memory generations are limited, requiring memory controller re-design when new memory generations are introduced.

In an effort to address these evolving needs, designers have developed new types of memory and memory systems. For example, one new type of memory known as storage class memory (SCM) uses dual inline memory modules (DIMMs) similar to standard DDR DRAM, but uses NAND Flash as a backing store and DRAM as a local cache for active data. One new type of memory system, known as GenZ, uses a standard interface protocol between processors and media in a communication fabric to support both directly attached memory and multiple levels of fabric attached remote memory of different types. Systems that will support multiple types of main memory, e.g. DRAM (fast memory) and storage-class memory (slow memory, large capacity), viewed as one physical address space will experience sudden spikes in memory usage for workloads with variable memory access patterns. Latency issues in workload performance is a problem in data processing systems and other environments.

For example, page migration policies require visibility into memory access trace information to determine which physical pages should be migrated to faster memory. Current systems do not typically provide precise page-level memory access traces. Limited informativeness can be provided by exploiting various features of the underlying system performance monitoring support. These include, but are not limited to, performance counter monitoring (PCM), Performance Application Programming Interfaces (PAPI), Instruction Based Sampling (IBS), Precise Event Based Sampling (PEBS) and LightWeight Profiling (LWP). These techniques however provide limited informativeness about the page memory access trace and/or have non-negligible performance overheads when used for virtual memory management.

Some other proposals rely on Page Table extensions where the access counts are kept for each page table entry (PTE) and the access counts are incremented in translation lookaside buffers (TLBs). This introduces operating system (OS) overhead for page migration policies because the OS needs to traverse the page tables to acquire the access information. In addition, such proposals may require non-trivial changes to the hardware/OS virtual memory management (VMM) support operations.

BRIEF DESCRIPTION OF THE DRAWINGS

The implementations will be more readily understood in view of the following description when accompanied by the below figures, wherein like reference numerals represent like elements, and wherein.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

Method and apparatus keep track, in some implementations, of all pages currently resident in cache memory, (e.g., level L3), cache line accesses to a page of memory. Memory access traffic is monitored, and metadata is generated regarding sudden spikes in memory usage and page main-memory access.

In some implementations, a method for monitoring memory access traffic in a data processing system includes tracking, such as by data fabric hardware control logic, a number of cache line accesses to a page of memory associated with one or more memory devices, and producing, by the hardware control logic, spike indication data that indicates a spike in cache line accesses to a page of memory. In some implementations the spike indication data is produced based on data representing the tracked number of cache line accesses. In some implementations, the tracking is done by updating a cache directory with the data representing the tracked number of cache line accesses. In some examples, the method includes moving the page from slower memory to faster memory (e.g., from an access latency perspective or from a bandwidth perspective). In some implementations the page is moved from a storage class memory to high bandwidth memory, based on the spike indication data.

In certain examples, the method includes comparing the data representing the tracked number of cache line accesses with a threshold indicating a number of cache line access counts signifying the spike in cache line accesses to a given page within a period of time, and wherein producing the spike indication data comprises notifying a memory scheduler of a spike event. In some examples, notifying the memory scheduler includes writing the spike indication data to a log, such as data file, accessible by the memory scheduler.

In certain examples, the tracked number of cache line accesses includes a count of read accesses and a count of write accesses issued to cache lines within a page of memory: (a) since a movement of data from the page probe filter entry to a log, such as a data file, and (b) over a defined time period to detect access spikes.

In some examples, the method includes determining, by the hardware control logic, if the count of read and write accesses since the last movement of data from the page probe filter entry to a log exceeds a desired amount and if so, recording a current time stamp of the event and reporting the event to the log, reporting, by the hardware control logic, a second current time stamp when the count over the defined time period goes back below the desired amount, and in response to reaching a predetermined access threshold, reporting a number of reads and writes issued since a last reporting of the spike indication data page probe filter entry to the log.

In certain examples, the method includes reporting the spike for a memory scheduler as a high priority notification in a scalable data fabric. In some examples, reporting the spike for the memory scheduler includes coalescing records of spikes corresponding to multiple pages and reporting the resulting coalesced data for the memory scheduler.

In certain examples, the method includes setting one or more configuration registers with data representing at least one of: a threshold cache line read access rate that constitutes a memory usage spike; a threshold cache line write access rate that constitutes a memory usage spike; a threshold for a length of time that cache line accesses have to continually spike; a pointer to log that contains spike indication data; and enabling a spike detection mode.

In some examples, the method includes determining which pages are getting high access as required by one or more workloads and moving the determined high access pages to a faster memory for access by the one or more workloads.

In certain implementations, a data processing system includes a host processor, a local memory coupled to the host processor, a scalable data fabric comprising hardware control logic operative to track a number of cache line accesses to a page of memory associated with one or more memory devices, and produce spike indication data that indicates a spike in cache line accesses to a page of memory. In some implementations, the tracking is done by updating a cache directory with data representing the tracked number of cache line accesses. In certain implementations the spike indication data is produced based on the data representing the tracked number of cache line accesses.

In some examples, the system includes a memory scheduler in communication with the hardware control logic, wherein the hardware control logic is operative to compare the data representing the tracked number of cache line accesses with a threshold indicating a number of cache line access counts signifying the spike in cache line accesses to a given page within a period of time, and notify the memory scheduler of a spike event.

In certain examples, the data representing the tracked number of cache line accesses includes count of read accesses and a count of write accesses issued to cache lines within a page of memory: (a) since a movement of data from the page probe filter entry to a log and (b) over a defined time period to detect access spikes.

In some implementation, a data processing system includes a host processor, a local memory coupled to the host processor, a plurality of remote memory devices, and a scalable data fabric coupled to the host processor and to the plurality of remote memory devices, wherein the scalable data fabric comprises hardware control logic operative to track a number of cache line accesses to a page of memory associated with one or more of the plurality of remote memory devices, such as by updating a page probe filter entry field with data representing the tracked number of cache line accesses, compare the data representing the tracked number of cache line accesses with a threshold indicating a number of cache line access counts signifying a spike in cache line accesses to a given page within a period of time, and produce spike indication data that signifies the spike in cache line accesses to a given the page of memory based on the data representing the tracked number of cache line accesses. In certain examples, the host processor moves the page to a faster memory based on the spike indication data.

In some examples, the hardware control logic determines if the count of read and write accesses since the last movement of data from the page probe filter entry exceeds a desired amount and if so then recording a current time stamp of the event and reports the event to the log, reports a second current time stamp when the count over the defined time period goes back below the desired amount. In some implementations, the hardware control logic, in response to reaching a predetermined access threshold, reports a number of reads and writes issued since the last movement of data from the page probe filter entry to the log.

In certain examples, the system includes a memory scheduler and the hardware control logic reports the spike for the memory scheduler as a high priority notification in the scalable data fabric. In some examples, the hardware control logic coalesces records of spikes corresponding to multiple pages.

In certain examples, the hardware control logic host includes configuration registers and the host sets one or more configuration registers with data representing at least one of: a threshold cache line read access rate that constitutes a memory usage spike; a threshold cache line write access rate that constitutes a memory usage spike; a threshold for a length of time that cache line accesses have to continually spike; a pointer to log that contains spike indication data; and enabling of a spike detection mode.

In some examples, the host processor moves the page to a faster memory (e.g., from slower main memory to faster main memory) based on the data representing the tracked number of cache line access requests exceeding the threshold by determining which pages are getting high access as required by one or more workloads and moving the determined high access pages to a faster cache for access by the one or more workloads.

Figure 1:
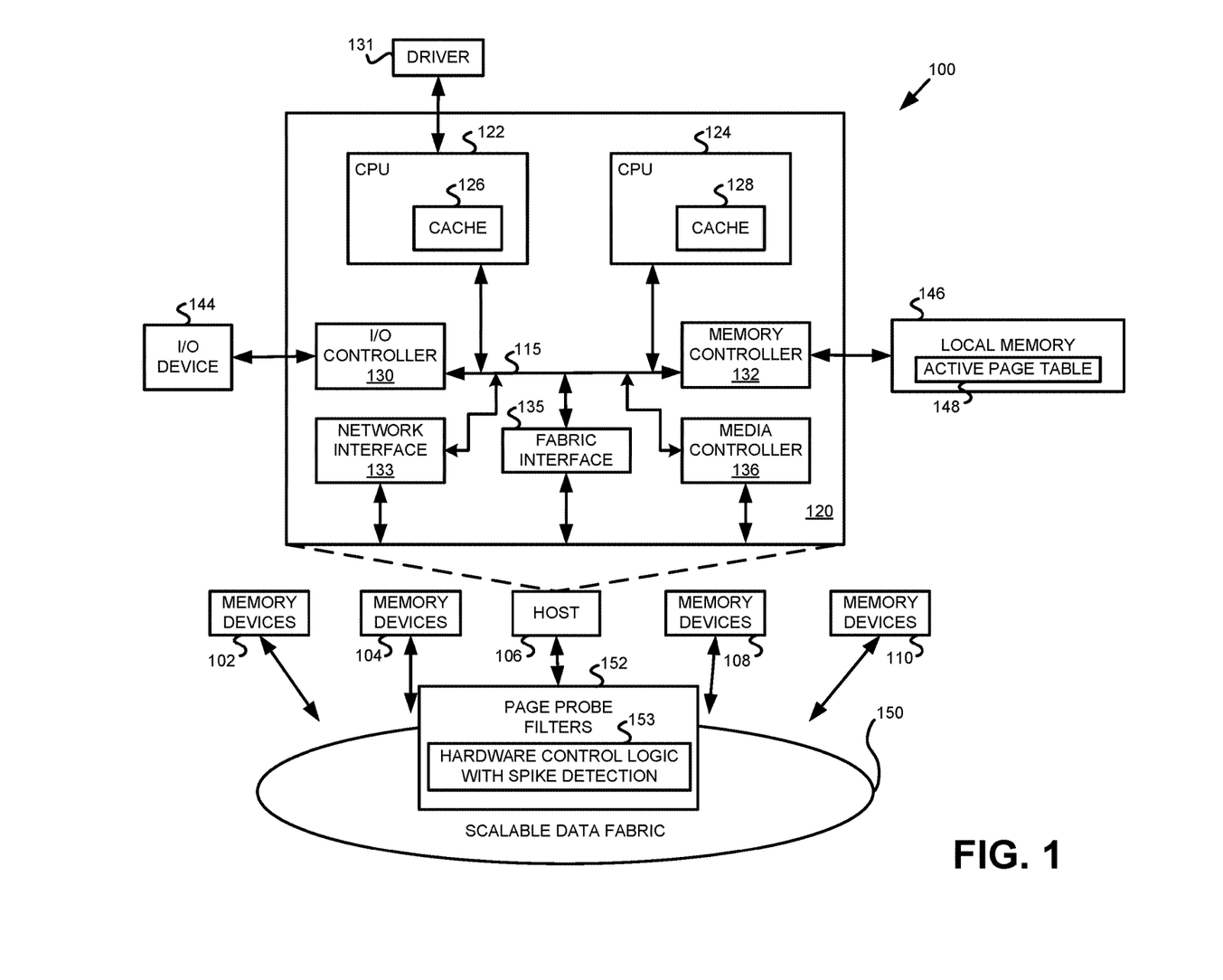
FIG. 1 illustrates in block diagram form a data processing system according to some embodiments.

FIG. 1 illustrates in block diagram form, a data processing system 100 according to some embodiments. Data processing system 100 includes a host 106 and memory devices 102, 104, 108, and 110 connected together by a scalable data fabric 150. Host 106 includes a host processor 120 having two central processing unit (CPU) 122 and 124 with associated caches 126 and 128, respectively, an input/output (I/O) controller 130, a driver 131, a memory controller 132, a network interface 133, a fabric interface 135, and a media controller 136. I/O controller 130 connects an associated I/O device 144 to host processor 120. In the illustrated example, I/O controller 130 implements a non-coherent form of the HyperTransport protocol to receive and store data that is not cached in data processing system 100. Network interface 133 is connected to a system interconnect 115 and implements a coherent form of the HyperTransport protocol. Memory controller 132 is connected to a local memory 146. In the illustrated embodiment, local memory 146 is implemented with DRAM.

System interconnect 115 connects CPU 122 and 124, I/O controller 130, memory controller 132, network interface 133, fabric interface 135, and media controller 136. In this example, host processor 120 includes two CPU 122 and 124, but in other embodiments, host processor 120 can include an arbitrary number of CPU cores. Each of caches 126 and 128 is bidirectionally connected to system interconnect 115 and is capable of providing memory access requests such as cache line fills, writebacks, and probe requests and responses to scalable data fabric 150 via memory controller 132 and fabric interface 135. Each of CPU 122 and 124 may be a unitary core or may further be a core complex with two or more unitary cores sharing certain resources such as caches 126 and 128. System interconnect 115 includes a crossbar switch for routing memory access requests and memory responses between any memory accessing agent and memory controller 132. System interconnect 115 also maintains a system memory map for determining destinations of memory accesses based on the system configuration, as well as various transaction buffers.

Memory devices 102, 104, 108, and 110 are remote data storage agents that provide access to data in external memory pools via scalable data fabric 150 which is shared between multiple compute agents such as CPUs 122 and 124.

Driver 131 is, for example, a module of an operating system (OS) kernel that serves a memory scheduler that makes page placement decisions based on information about memory access patterns. For example, driver 131 relocates the pages most frequently accessed by host processor 120 from other pools in scalable data fabric 150 to local memory 146.

Memory controller 132 is the mechanism for data transfer between host processor 120 and all memory in the system, including local memory 146 and memory devices 102, 104, 108, and 110. Memory controller 132 is connected to and receives memory access requests from memory accessing agents over system interconnect 115. Memory controller 132 offloads the task of initiating and terminating memory accesses from CPU 122 and 124. Memory controller 132 also includes a media controller for local memory 146 having internal queues to allow efficient use of the external bus to local memory 146. In the illustrated embodiment, local memory 146 is implemented using DRAM, but could be implemented by other types of memory besides DRAM, such as static RAM, nonvolatile memory, or any suitable type of memory.

I/O device 144 is an input/output device that functions as a producer of non-cacheable data. In the example shown in FIG. 1, I/O device 144 complies with the non-coherent form of the HyperTransport™ I/O Link Specification, Revision 1.03, © 2001 HyperTransport Technology Consortium.

Local memory 146 is connected to host processor 120 through memory controller 132. In other embodiments, local memory 146 can be implemented with other forms of memory such as high band width memory (HBM), phase-change memory (PCM), and other similar types of page-oriented memory. Local memory 146 includes active page table 148 that stores information locally to host processor 120 to help driver 131 make page migration decisions.

Scalable data fabric 150 is a hierarchical interconnect that provides data transfer between low-latency memory pools, such as memory devices 102, 104, 108, and 110 and host processor 120. Scalable data fabric 150 utilizes a packet-based protocol, such as the coherent HyperTransport (cHT) protocol, to provide a latency-insensitive load-store interface between processing elements and memory modules. Scalable data fabric 150 is scalable per component and the components do not have to be directly attached to host processor 120. Instead the components can be connected via switched or scalable data fabric topologies with gateways to other networks (e.g. Ethernet and InfiniBand networks). Scalable data fabric 150 also facilitates the use of higher latency non-volatile random-access memory (NVRAM) and other memory types. In these memories, the write latency tends to be larger than the read latency. In one embodiment, scalable data fabric 150 implements a protocol developed by the GenZ Consortium. However scalable data fabric 150 could implement any other similar protocol.

Scalable data fabric 150 includes a set of one or more page probe filters 152. In the exemplary embodiment that will be described further below, page probe filters 152 store information indicating locations of data elements that are cached anywhere in the system, and other filters that track non-cacheable memory accesses. As set forth below, hardware control logic 153 with memory access spike detection is added as part of a page probe filter.

In the illustrated embodiment, driver 131 runs on CPU 122 and periodically scans active page table 148 and a log file (e.g., that includes spike indication data and cache line access count information) to determine which pages being accessed by CPU 122 and 124 are currently stored in a slower or more remote memory, e.g. one of memory devices 102, 104, 108, and 110, or slower memories within the local memory and utilizes a system call known as "movepage" to migrate selected pages to local memory 146. In some implementations, the driver 131 and the memory controller move pages between the memory devices 102, 104, 108 and 110. In certain implementations where the local memory is made of up different types of memory devices (some slower and others faster) pages are moved within the local memory. Thus, driver 131 in conjunction with the memory controller 132 opportunistically moves data to improve the locality of data placement in a system with a complex, scalable data fabric.

Figure 2:
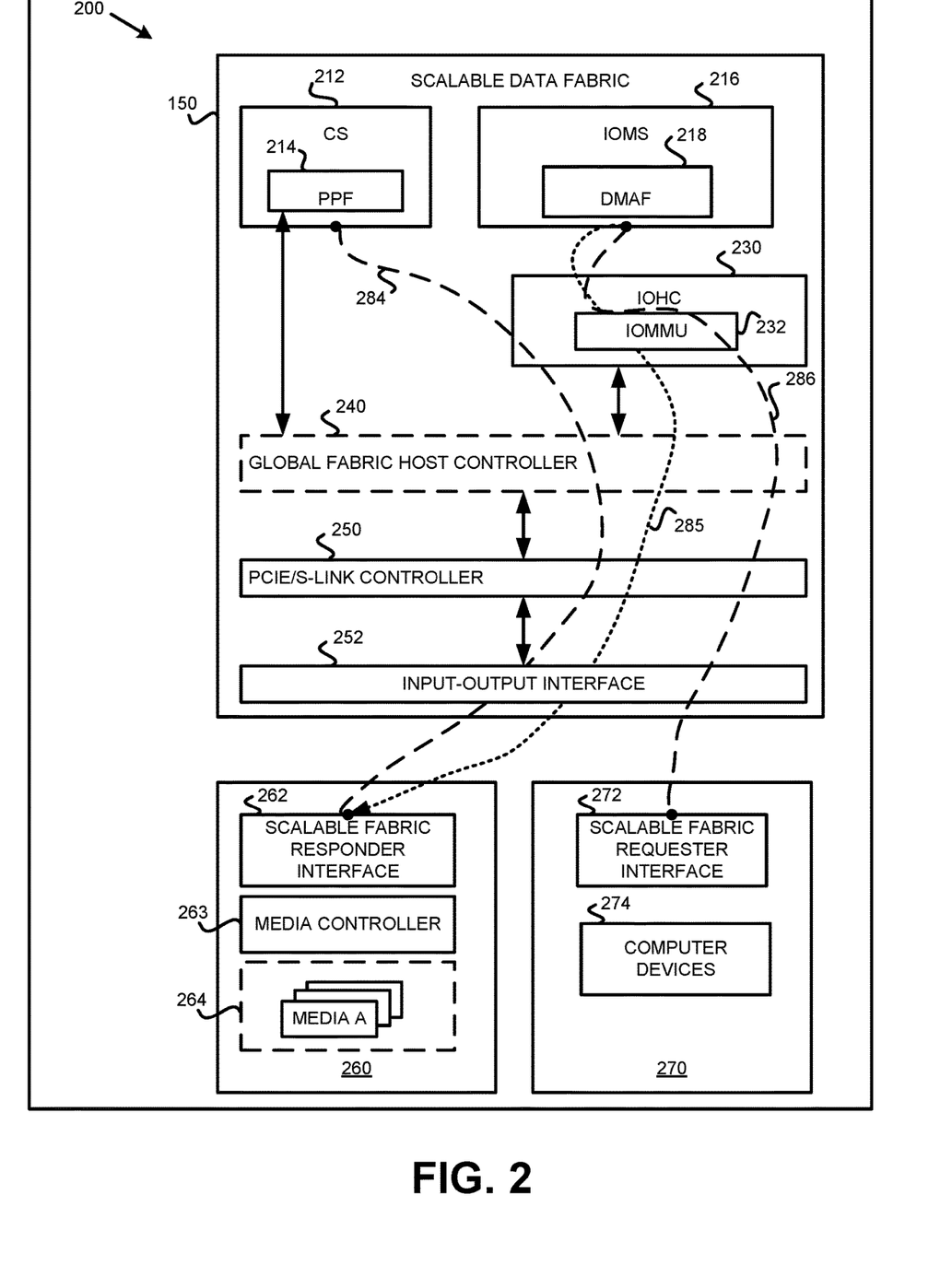
FIG. 2 is a block diagram illustrating one example of an extended scalable fabric system for use in a data processing system in accordance with one example set forth in the disclosure.

FIG. 2 illustrates in block diagram form an extended scalable fabric system 200 for use in data processing system 100 of FIG. 1 according to some embodiments. Extended scalable fabric system 200 includes generally scalable data fabric 150, a responder network 260, and a requester network 270 including host processor 120 (not specifically shown in FIG. 2).

Scalable data fabric 150 includes generally a coherent slave (CS) 212, an input/output master/slave (IOMS) 216, an input/output host controller (IOHC) 230, a global fabric host controller 240, a Peripheral Component Interconnect express (PCIe)/S-link controller 250, and an input/output interface 252. CS 212 manages coherence for all the physical memory associated with scalable data fabric 150. CS 212 acts as a scalable ordering point for memory access and guarantees scalable visibility for memory accessing agents associated with extended scalable fabric system 200. Further, CS 212 enables address serialization and launches probes for coherence purposes. CS 212 is responsible for maintaining ordering and coherency for received memory access requests. CS 212 implements a cache coherency protocol, such as coherent HyperTransport (cHT). CS 212 interfaces with memory controller 132 through a socket direct protocol (SDP) port. CS 212 includes hardware control logic, in this example in the form of a page probe filter (PPF) 214 with spike detection that is a hardware filter circuit that enables a global view of all recently accessed pages. In some implementations, PPF 214 includes a list of all pages which are actively cached anywhere in data processing system 100. PPF 214 tracks the memory corresponding to the DRAM addresses owned by the memory channel associated with CS 212. To facilitate page movement decisions, PPF 214 exposes selected information from its tag and data arrays, directly or indirectly, to driver 131 of the operating system.

IOMS 216 is a module that serves accesses to memory associated with scalable data fabric 150 and is also an entry point of all direct memory access (DMA) (non-cacheable) memory requests from scalable data fabric 150 to host processor 120. IOMS 216 includes a DMA filter (DMAF) 218 that, like PPF 214, is a hardware filter circuit. IOMS 216 contains both master and slave functionality and hence has two SDP ports: (i) a master SDP for DMA accesses from an I/O device, and (ii) a slave SDP for downstream accesses from host processor 120 to a media memory device. DMAF 218 tracks memory accesses going through IOMS 216 via the two SDP ports. To facilitate data movement decisions, DMAF 218 exposes this information, directly or indirectly, to driver 131 of the operating system.

Driver 131 periodically scans active page table 148 and uses the data from a log file that includes spike indication data, cache line access count data and other data as described below to determine what pages are candidates for data movement to faster memory. For example, data movement candidates could be data currently cached in slow non-volatile RAM (NVRAM) or memory in extended scalable fabric system 200. In some implementations instead of the memory controller 132 moving pages, the scalable fabric 150 includes a DMA engine that utilizes a predetermined system call, e.g. the "movepage" system call, to migrate the pages to local memory 146. In other implementations, the operating system controls movement of pages from a current memory that is slow to a faster memory.

IOHC 230 includes an input/output memory management unit (IOMMU) 232 to translate local memory addresses into corresponding system addresses. Global fabric host controller 240 is connected to both CS 212 and IOMS 216 (through IOHC 230) and has a port for receiving requests from and providing responses to fabric-attached requestors. Global fabric host controller 240 may include a separate address translation mechanism and performs link control using link-defined protocols, such as the GenZ protocol.

PCIe/S-link controller 250 performs lower-level communication between the components in extended scalable fabric system 200 using the packet-based protocol known as the "PCI Express" (PCIe) protocol defined by the PCI Special Interest Group. In an alternative embodiment, PCIe/S-link controller 250 could implement any other similar link protocol that is capable of operating between components connected in a hierarchy.

Input/output interface 252 provides buffering and physical interfaces between components in scalable data fabric 150 and requestors and responders connected to it.

In one embodiment, the components of scalable data fabric 150 are combined in one integrated circuit (IC) and the components of host processor 120 in another IC. In an alternate embodiment, all of these circuits are combined in a single IC.

Responder network 260 includes, generally, a scalable fabric responder interface 262, a media controller 263, and a media group 264. Scalable fabric responder interface 262 communicatively connects to scalable data fabric 150 and enables access to remote memory pools such as media groups 264. Media controller 263 provides an interface to particular types of media, such as DRAM, NVRAM, Flash memory, and the like. Media group 264 includes a set of remote memory devices. Each of remote memory devices can include, for instance, a computing device at a location remote to host processor 120. Responder network 260 provides data to and receives data from remote memory devices via scalable data fabric 150.

Requester network 270 includes a scalable fabric requester interface 272, and one or more compute devices 274, such as host processor 120 of FIG. 1. Each compute device 274 is a memory accessing agent that provides requests to scalable data fabric 150.

Extended scalable data fabric system 200 improves efficiency of data placement in data processing system 100 by making information stored in PPF 214 and DMAF 218 visible to the operating system. Thus the operating system can make opportunistic page migration decisions and thereby dynamically improve the locality of data accesses. Hardware control logic stores data in a log file, as set forth below, that is accessible only by the operating system to make opportunistic page migration decisions.

In one example of data flow, an access to media memory is received at scalable data fabric 150. Line 284 illustrates a path of the access from CS 212 to media memory. PPF 214 stores information indicating a location of the data that is cached by the data processing system. The information associated with the data can be stored in the form of a data array. Alternatively, line 285 illustrates a request to migrate uncacheable data to media memory. DMAF 218 stores information indicating a location of the data that is not cached by the data processing system. In another embodiment, line 286 represents a path in which scalable data fabric 150 receives a memory access request from a compute device 274. The path of migration provides the information associated with the data to IOMS 216 via IOMMU 332. PPF 214 and DMAF 218 can each store the information that characterizes the data in a combined data array or separate data arrays.

Hardware control logic 153 logs spike indication data and cache line access counts as part of the PPF 214 to make it easy for a memory scheduler such as a processor implementing driver 131 or operating system to make page migration decisions.

Figure 3:
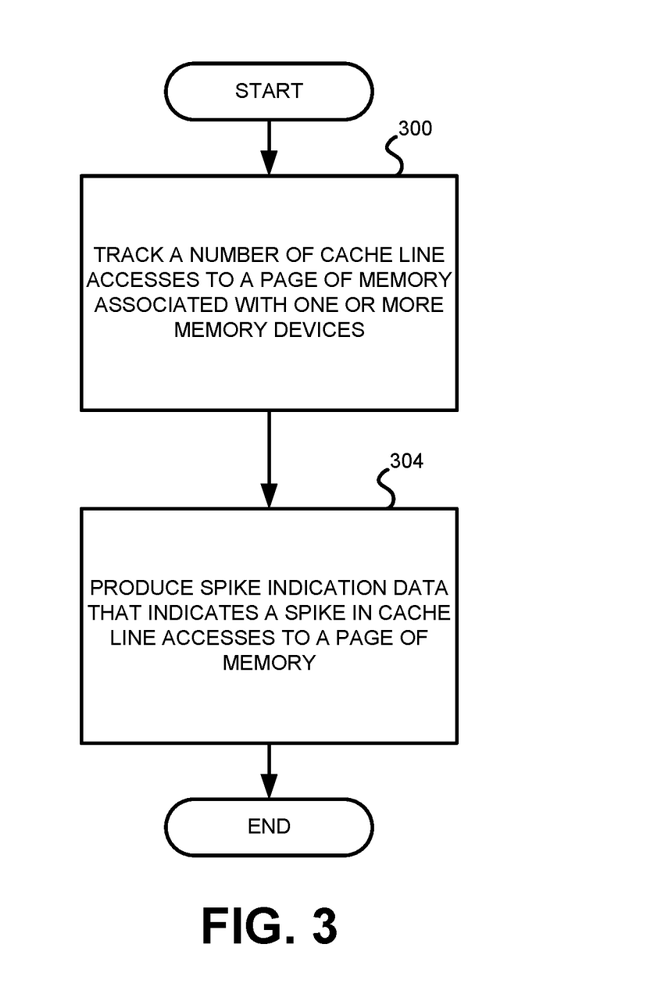
FIG. 3 is a flowchart illustrating a method for monitoring memory access traffic according to an example set forth in the disclosure.
Figure 4:
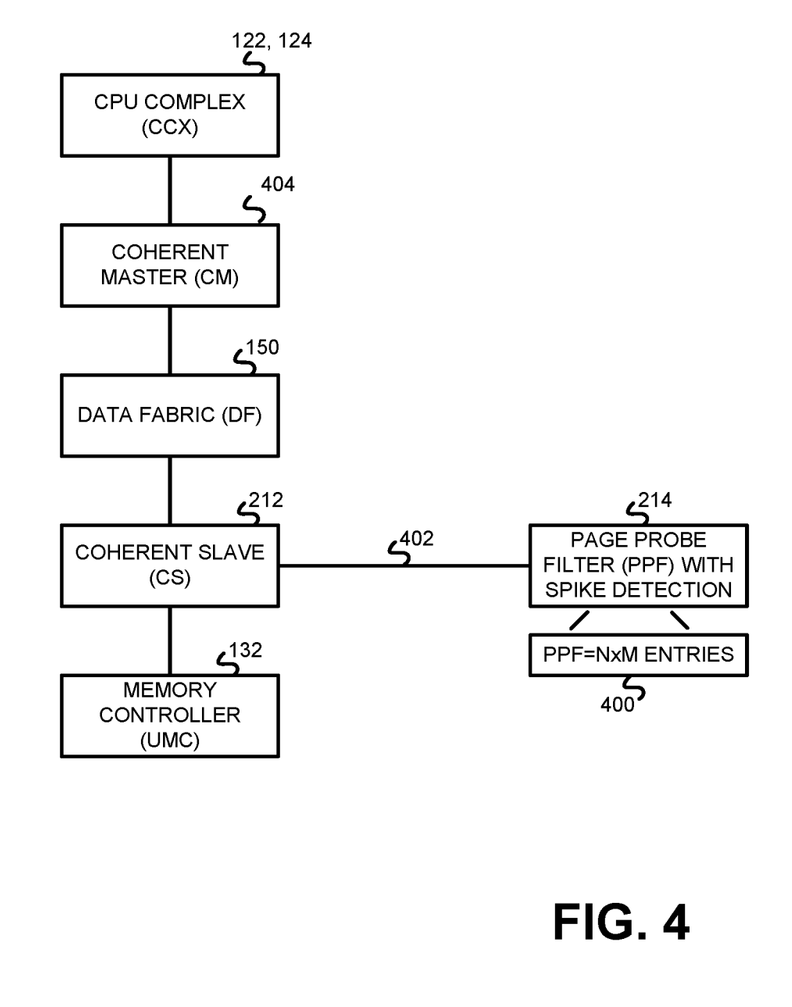
FIG. 4 is a block diagram illustrating one example of a data processing system according to an example set forth in the disclosure.

FIG. 3 is a flowchart illustrating one example of a method for monitoring memory access traffic in a data processing system and in this example is carried out by hardware control logic 153. However, any other suitable hardware logic may also perform the operations described herein. In addition, the order of the operations may be any suitable order as desired. As shown in block 300, in some implementations, the hardware control logic 153 that in one example is part of the scalable data fabric 150 tracks a number of cache line accesses to a page of memory associated with one or more memory devices such as the remote memory devices 102, 104, 108 and 110. In one example, tracking is performed by updating, a cache directory, such as a page probe filter entry field, with data representing the tracked number of cache line accesses. As shown by block 304, the method includes producing spike indication data that indicates a spike in cache line accesses to a given page of memory. In some examples this is done based on the data representing the tracked number of cache line accesses. The spike indication data may be, for example, data in a page probe filter entry field, a register pointer to data in memory, a hardware log entry, a notification in the form of an interrupt, or any other suitable mechanism. In some implementations when a spike is detected, the memory scheduler, such as the operating system in one example, moves the page from a slower memory to a faster memory based on the spike indication data. A spike in cache line access can be based on any suitable criteria. In one example, a spike is determined based on comparing a number of cache line accesses to a threshold value, such as a programmable threshold. In other implementations, the spike is determined based on comparing a number of cache line accesses that occur over a period of time, to a threshold value. The period of time in some examples is a programmable value stored in a register.

fields, such as a cache directory that includes additional fields that track a number of cache line accesses for pages across an L3 cache level in a memory hierarchy of a data processing system. In one example, the scalable data fabric employs hardware control logic that collects the data to indicate a spike in cache line usage to a given page of memory.

Referring to FIGS. 4-7, an example structure and operation of data fabric hardware control logic 153 will be described and in this example, the hardware control logic 153 is implemented as the page probe filter 214 with spike detection. The page probe filter 214 utilizes a data fabric cache directory structure that includes entries 400 that form a list of all pages which are actively cached anywhere in the system. The page probe filter 214 is logically a part of the coherent slave (CS) module. The PPF 214 tracks the memory corresponding to the memory addresses owned by the associated CS memory channel. The coherent master (CM) 404 is the interface between a CPU complex (CCX), consisting of multiple CPU 122, 124, and the data fabric 150. The coherent master (CM) 404 receives requests from the CPU 122, 124 and forwards them to the data fabric 150. The coherent master (CM) 404 receives coherency probes and probe response from the data fabric 150 and sends them to the CPU complex (CCX).

Figure 5:
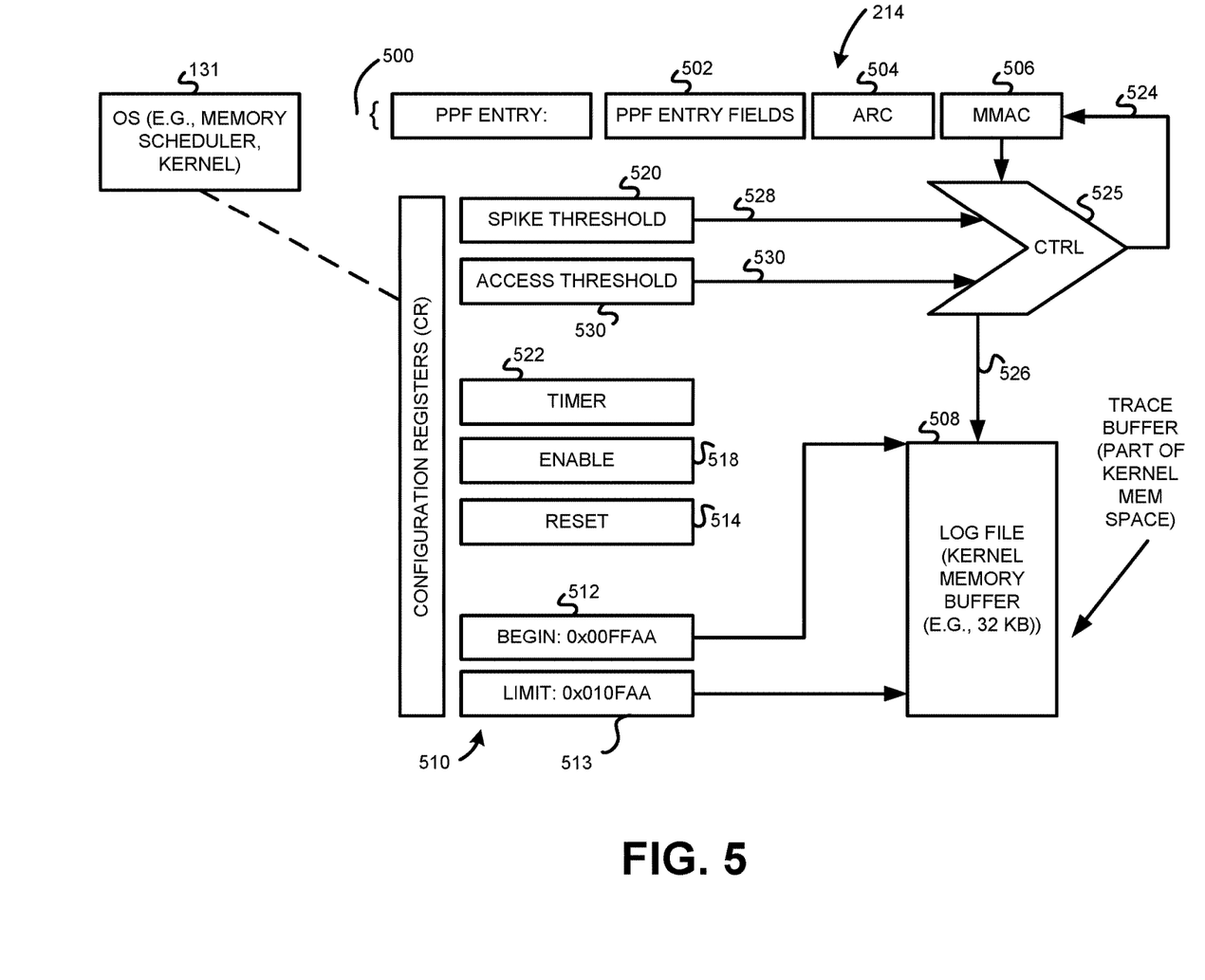
FIG. 5 is a block diagram illustrating one example of hardware control logic in accordance with one example set forth in the disclosure.

As shown in FIG. 5, as an example, each PPF entry 500 in the cache directory structure has multiple PPF entry fields 502, including an Aggregate Reference Count (ARC) field 504 which can be considered extended by adding a Main Memory Access Count (MMAC) field 506 (see Table 1) to include the precise memory access data that is useful for both the workloads that exhibit predictable, as well as spiky, behavior during runtime as shown in Table 1 below.

TABLE 1

| Field name | Description |
| --- | --- |
| ARC (Aggregate Reference Count) | The Aggregate Reference Count tracks a count of cached copies of the 32/64 $ lines within a 2K/4K page in CCXs (it does not track number of cache hits, since those are invisible to CS). This count is kept accurate to have the ability to reclaim the entry when the count drops to 0. Once the count saturates it can no longer be precisely tracked. Once the count maxes out at 255, the ARC is never decremented and is only reclaimed by a downgrade. |
| MMAC (Main Memory Access Count) | The MMAC field contains data representing: Reads/ns and writes/ns issued to any $ lines within the 2K/4K PPF page that pass via the CS a) since the last reset event (e.g., since dumping to the log). b) over the last ms. If (b) exceeds (a) by e.g. 10x, then record the current timestamp of the event and immediately report to the log. Report the current timestamp once again when the (b) goes back to below 10x of (a). Upon reaching a predetermined access threshold (set via a configuration register), reports the number of reads and writes issued since the last reset to the log. |

It has been found that when running a cloud workload and compared against prior page access traffic tracking systems, wrong impressions on a number of hot pages are reduced. In some implementations, a more accurate page access profiling operation is done through a data-fabric hardware solution for page-based probe filtering. For large data processing platforms such as cloud computing platforms and other server platforms, a timely and efficient propagation of sudden spikes in resource activity along with a measure of its frequency on a given system is provided. In some examples, an enhanced system probe filter employs additional tracking As illustrated in Table 1, in some examples, the MMAC field includes data (e.g., one or more bits) representing a number of cache line accesses to a page of memory associated with one or more of the memory devices 102, 104, 108 and 110 making up main memory of the data processing system by updating a cache directory with data representing the tracked number of cache line accesses. In one example the data is a count of read accesses and a count of write accesses issued to cache lines within a page of memory: (a) since a movement of data from the page probe filter entry to a log and (b) over a defined time period to detect access spikes. The MMAC field in certain implementations also includes a timestamp of the start of a detected spike in accesses to a page. The MMAC field in some implementations also includes a timestamp of an end of the detected spike. As further described below, in some implementations, the PPF 214 compares the data representing the tracked number of cache line accesses within a page with a threshold indicating a number of cache line access counts signifying the spike in cache line accesses to a given page within a period of time; and produces spike indication data by notifying a memory scheduler of a spike event. In some implementation the log file contains the physical address of the page and the contents of the MMAC field.

Highly descriptive metrics are beneficial, particularly if utilized fast, as the more detailed the trace data is, the faster it becomes "stale" and useless (or, worse, misleading). In some implementations, the workload with fast reaction time to the collected monitoring data can leverage it. Thus, the robust reporting mechanism of sharing the spike information with the memory scheduler is needed helps maintain the Service Level Agreements (SLAs) related to memory access. By receiving the timely data about the memory usage spikes happening and the total number of accesses for each page, the memory scheduler promptly determines the most crucial pages required by the workloads and move them into the best memory possible, thus avoiding memory bottlenecks.

In certain implementations, when the MMAC is implemented as an x86 extension, to timely report the data about the start (front) and end (back) of the spike, the hardware control logic assigns the spike page access trace extension (SPATE) writes reporting the spiked behavior to a log file 508 (FIG. 5) from the CS 212, the highest priority in the data fabric. Due to the fabric's congestion, often only a limited number of SPATE writes can propagate in a timely manner. To alleviate that, the mechanism also reduces the number of the required SPATE writes by coalescing the records of multiple 2K/4K pages that are to report the spike behavior. Coalescing can be performed in a data fabric buffer by scanning the buffer for page addresses for which a spike behavior has been reported but has not yet been written to a log file or operating system memory.

In some implementations, the PPF 214 includes a set of configuration registers (CRs) 510 available to the memory scheduler or other suitable configuration mechanism are used, including one or more registers 512 that set the log file location, reset 514 the configuration registers (CRs) 510, set 516 an access threshold 530 for reporting, enable/disable 518 the spiked page access trace operation (for example when implemented as an extension), set a spike threshold 520 and set a time period through a timer 522. In addition to MMAC thresholds and pointers to the log, the control registers can include other control registers for controlling timing information or other useful control operations. As such, the configuration registers, in some examples, contain data representing at least one or more of a threshold cache line read access rate that constitutes a memory usage spike, a threshold cache line write access rate that constitutes a memory usage spike, a threshold for a length of time that cache line accesses have to continually spike, a pointer to a log that contains spike indication data and enabling a spike detection mode.

As shown by line 402 (FIG. 4) each DRAM access is tracked by the PPF 214 (per CS). As shown by line 524, control logic 525 updates the MMAC field 506 with tracked cache line access counts and other information (see e.g., Table 1). The control logic 525 in one example is implemented as one or more state machines but may be implemented as a programmed field programmable gate array or any suitable hardware circuitry The PPF entry 500 includes the Main Memory Access field 506 (MMAC) which in one example, tracks reads/ns and writes/ns issued to any cache lines within the 2K/4K SPF page that pass via the CS: a) since the last reset event (e.g., since dumping to the log) and b) over the last ms. The control logic 525 updates the MMAC field 506 accordingly. As shown by line 527, if the number of counts recorded over the last ms exceeds the spike threshold 528 which signifies a number of cache line access counts signifying a spike in line accesses to a given memory page within a period of time (e.g., ms), the control logic 525 produces spike indication data by notifying the memory scheduler of a spike event.

For example, if (b) exceeds (a) by e.g. 10×, then the control logic 525 records the current timestamp of the event in the MMAC field indicating a start of a spike event and immediately reports a spike event to the log as shown by line 526. The control logic 525 reports the current timestamp once again when the (b) goes back to below 10× of (a) to indicate an end of the spike event.

In some implementations, the control logic 525 upon reaching a predetermined access threshold 530 (set via a configuration register), updates the MMAC field and reports the number of reads and writes issued since the last reset to the log. The Configuration Registers 510 values can be set by the driver 131 (e.g., kernel). The configuration registers for the access threshold and spike threshold can be set to any suitable value depending upon the desired sensitivity.

If any of the spike conditions and/or access threshold conditions are met, the control logic 525 writes the (useful) contents of that PPF entry (e.g. PA, MMAC) to the kernel log reserved for the page access trace. The configuration register 512 point to the next available entry in the log (BEGIN). The PPF metadata may also be written to the trace buffer on PPF entry evictions (called downgrades).

In some implementations, the BEGIN register 512 and LIMIT register 513 are reset when the log file (e.g., a page access trace buffer) gets consumed by the driver 131. The driver 131 reads the data periodically or on a buffer overflow (when the LIMIT is reached and an interrupt is triggered) and decides on a VMM policy, primarily page migration.

Figure 6:
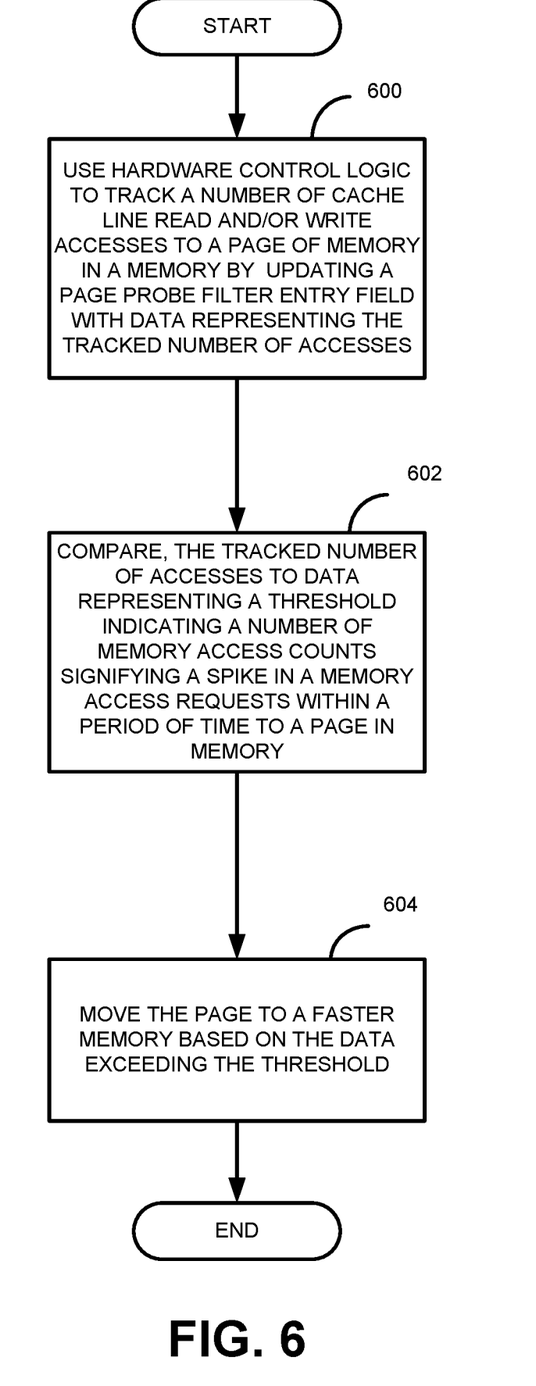
FIG. 6 is a flowchart illustrating a method for monitoring memory access traffic according to an example set forth in the disclosure.

FIG. 6 is a flowchart illustrating one example of a method for monitoring memory access traffic. The operations may be performed in any suitable order. As shown in block 600 the method includes tracking, such as by the control logic 525 of the hardware control logic 153, a number of cache line accesses to a page of memory associated with one or more devices by updating a cache directory, such as the MMAC field, with data representing the tracked number of cache line accesses. For example, each time a CS checks a page probe filter to see if a cache line should be accessed from a page residing in memory, the control logic 525 updates the read or write counter accordingly. By extending each the PPF with the MMAC field each cache line accesses to pages is tracked but only for pages which are cached in the system. If desired, a cache directory (PPF) can be used in every multicore/multiprocessor system. As shown in block 602 the method includes comparing, such as by control logic 525, the data representing the tracked number of cache line accesses from the MMAC field with a threshold, such as spike threshold 528 indicating a number of cache line access counts signifying the spike in cache line accesses to a given page within a period of time. As shown in block 604 the method includes moving, such as by the driver 131, the page from a slower memory to a faster memory based on the spike indication data.

Figure 7:
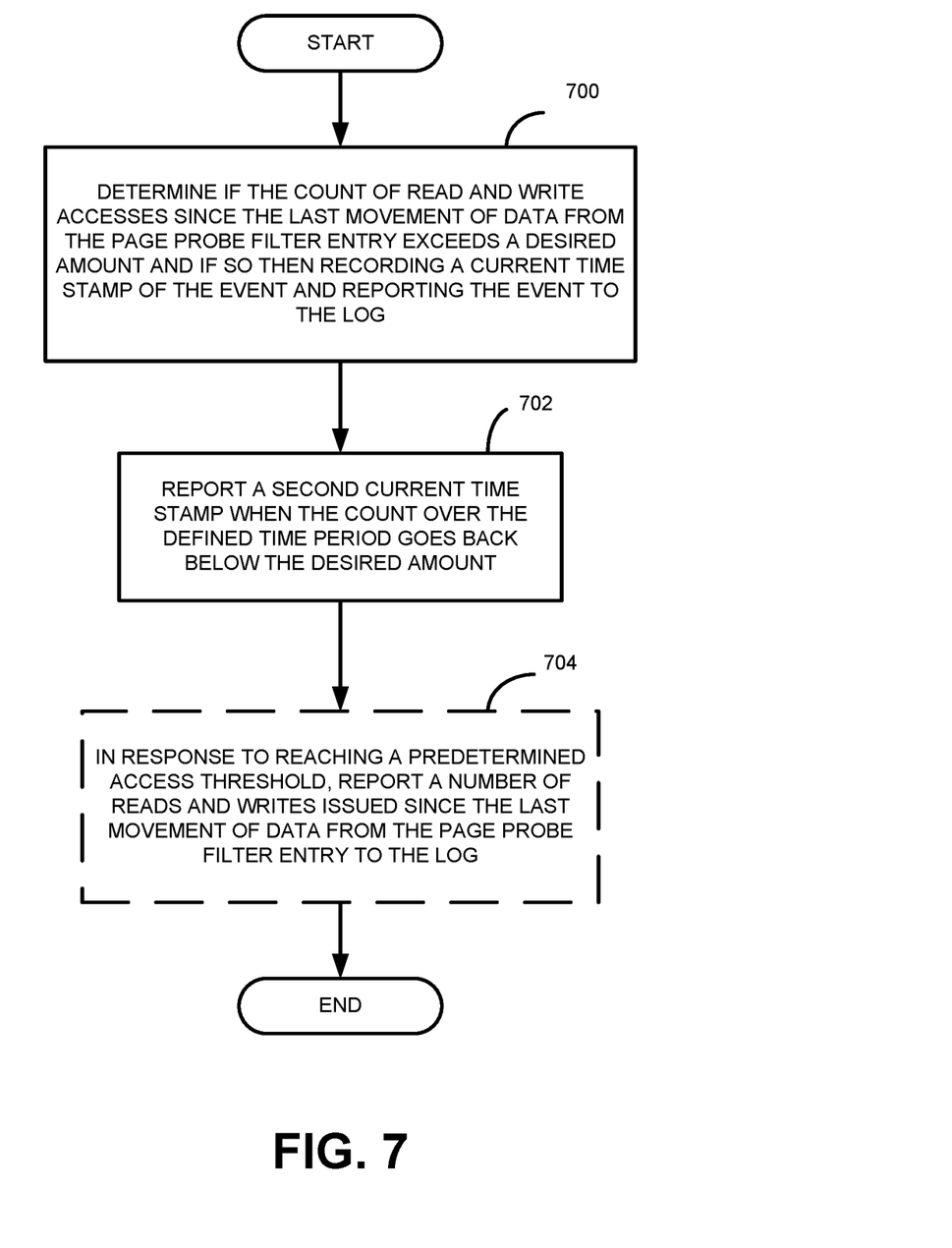
FIG. 7 is a flowchart illustrating a method for monitoring memory access traffic according to an example set forth in the disclosure.

FIG. 7 is a flowchart illustrating one example of a method for monitoring memory access traffic that tracks a start and end of a spike as well as a number of cache line accesses based on an/access threshold. The operations may be performed in any suitable order. As shown in block 700 the method includes determining a start of a spike event by determining if the count of cache line read and write accesses since the last movement of data (e.g., since the last reporting to the log) exceeds a desired amount. If the count is exceeded, the current time stamp is recorded and the spike event is reported for the memory scheduler. For example, if the number of reads/ns and writes/ns to any cache lines since a last reset event the number detected over the past ms exceeds the numbers tracked per ns by 10×, a spike event is determined, and the current time stamp is recorded and the spike event is reported to the log. A shown in block 702, the end of the spike event is tracked. The method includes reporting, such as by the control logic 525, a second current time stamp when the count over the defined time period goes back below the desired amount. For example, the current time stamp is reported once again when the tracked count goes back below the 10× amount used as the spike level. As shown in block 704, the method may include reporting a number of reads and writes cache lines since the last reporting of the spike indication data for the page probe filter entry to the log.

In some implementations, the MMAC is implemented as a hardware extension for x86 type processors, or any other suitable type of processor, for virtual memory management support which promptly identifies spikes in memory usage and traces memory accesses to frequently accessed memory pages. The mechanism then exposes the information to a memory scheduler (such as a hardware controller in one embodiment but can also be an Operating System (OS) kernel) through a log file. In some examples, a page probe filter employs a data fabric cache directory which maintains coherence on a page granularity (2K/4K), with page access metadata (e.g., spikes and access counts). This information, in some implementations is polled by the kernel virtual memory manager or software runtime to guide the page-migration policies for tiered memory systems.

In some implementations, the page probe filter keeps track of all pages currently resident in L3 memory in order to maintain cache coherence and tracks useful metadata about the sudden spikes in memory usage and page main-memory accesses: such as how many times a page has been accessed in main-memory. The page memory access metadata is periodically flushed to a log file accessible only by the memory scheduler. This includes access counts, physical addresses, and other potentially useful information. In some implementations, the metadata is written to a trace buffer on entry evictions (called downgrades). If there are suddenly many accesses to a given page, the PPF records the time stamp of the spike event and notifies the memory scheduler right away. The memory scheduler will set/reset the configuration registers which enable/disable the widget, point to the log file and perform other operations as described above.

As described with respect to FIGS. 1-7, in some implementations, a data processing system includes a host processor, a local memory and a scalable data fabric that includes hardware control logic that tracks a number of cache line accesses to a page of memory associated with one or more memory devices by updating a cache directory, such as a page probe filter entry field, with data representing the tracked number of cache line accesses. The data fabric hardware control logic produces spike indication data that indicates a spike in cache line accesses to a given page of memory based on the data representing the tracked number of cache line accesses. The one or more memory devised in some implementations includes remote memory storage that is used as data processing system main memory.

In certain implementations, the data processing system includes a memory scheduler, such as a processor executing an operating system or hypervisor, wherein the hardware control logic compares the data representing the tracked number of cache line accesses with a threshold indicating a number of cache line access counts signifying the spike in cache line accesses to a page in memory and notifies the memory scheduler of a spike event. In some implementations, the data representing the tracked number of cache line accesses includes a count of read accesses and a count of write accesses issued to cache lines within a page of memory: (a) since a movement of data from the page probe filter entry to a log and (b) over a defined time period to detect access spikes.

In certain implementations, a data processing system includes a host processor, a local memory in communication with the host processor, a plurality of remote memory devices; and a scalable data fabric coupled to the host processor and to the plurality of remote memory devices. In some examples, the scalable data fabric includes hardware control logic that tracks a number of cache line accesses to a page of memory associated with one or more of the plurality of remote memory devices by updating a page probe filter entry field, with data representing the tracked number of cache line accesses. In some implementations, the hardware control logic compares the data representing the tracked number of cache line accesses with a threshold indicating a number of cache line access counts signifying a spike in cache line accesses to a given page within a period of time and produces spike indication data that signifies the spike in cache line accesses to a given page of memory based on the data representing the tracked number of cache line accesses.

In certain implementations, the host processor, such as through an OS or hypervisor, moves the page to a faster memory based on the spike indication data, such as from a lower speed memory to a higher speed memory. In some implementations, the hardware control logic determines if the count of read and write accesses since the last movement of data from the page probe filter entry exceeds a desired amount and if so, records a current time stamp of the event, representing a start of a spike, and reporting the event to a log file, such as a log file accessible only by the host processor. The hardware control logic reports a second current time stamp, such as the end of the spike, when the count over the defined time period goes back below the desired amount. In some implementations the hardware control logic also tracks a number of cache line reads and writes to a given page of memory and in response to reaching a predetermined access threshold, reports a number of reads and writes issued since the last movement of data from the page probe filter entry to the log.

In certain implementations the hardware control logic reports the spike for the memory scheduler as a high priority notification in the scalable data fabric. In some implementations, the hardware control logic coalesces records of spikes corresponding to multiple pages and reports the coalesced data to the memory controller to reduce communication traffic levels between the memory scheduler and the scalable data fabric.

In some implementations, the hardware control logic includes configuration registers that configure and control a spike detection mode of operation. In certain implementations, the host processor includes the configuration registers. In other implementations the control registers are included in other components in the data processing system. In certain examples, the host processor sets one or more configuration registers with data representing one or more of a threshold cache line read accesses rate that constitutes a memory usage spike, a threshold cache line write access rate that constitutes a memory usage spike, a threshold for a length of time that cache line accesses have to continually spike, a pointer to log that contains spike indication data and that enables a spike detection mode.

In certain implementations, the host processor moves the page to a faster memory, such as from a slower type of memory to a faster type of memory, based on the data representing the tracked number of cache line access requests exceeding (as used herein "exceeding" includes equating to a threshold) a threshold. In some examples, a memory scheduler determines which pages are getting high access as required by one or more workloads and moving the determined high access pages to a faster cache level or faster memory than a current memory, for access by the one or more workloads.

Among various other technical improvements, in certain implementations, unlike other page probe filter implementations, the PPF MACC entry contents include correct memory access counts, increasing informativeness about the memory access trace and allows the hardware control logic to write to a log file without waiting for the OS kernel or a hardware sequencer to poll the PPF entries. There is no need to poll all the contents of all PPFs in all coherent slaves (CS) which results in lower performance overhead. In some implementations, detection of spikes in memory access are reported immediately such as through an immediate report to the log file for access by the driver 131 or directly to the memory controller 132 which moves the page to a faster memory. The hardware control logic is also highly configurable through the set of configuration registers.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A data processing system comprising:
   a host processor;
   a memory coupled to the host processor;
   a scalable data fabric operatively coupled to the host processor and comprising hardware control logic operative to:
      track a number of cache line accesses to a page of main memory associated with one or more data fabric attached remote memory devices; and
      produce spike indication data, that is accessible by a memory scheduler, that indicates a spike in cache line accesses to a given page of main memory associated with the one or more data fabric attached remote memory devices.

2. The data processing system of claim 1 comprising the memory scheduler in communication with the hardware control logic, wherein the hardware control logic is operative to:
   compare the data representing the tracked number of cache line accesses with a threshold indicating a number of cache line access counts signifying the spike in cache line accesses to a given page within a period of time; and
   notify the memory scheduler of a spike event.

3. The data processing system of claim 1 wherein the data representing the tracked number of cache line accesses comprises a count of read accesses and a count of write accesses issued to cache lines within a page of main memory: since a movement of data from the page probe filter entry to a log and over a defined time period to detect access spikes.

4. A data processing system, comprising:
   a host processor;
   a memory coupled to the host processor;
   a plurality of remote memory devices; and
   a scalable data fabric coupled to the host processor and to the plurality of remote memory devices, wherein the scalable data fabric comprises:
      hardware control logic operative to:
         track a number of cache line accesses to a page of memory associated with one or more of the plurality of remote memory devices by updating a page probe filter entry field with data representing the tracked number of cache line accesses;

compare the data representing the tracked number of cache line accesses with a threshold indicating a number of cache line access counts signifying a spike in cache line accesses to a given page within a period of time; and produce spike indication data that signifies the spike in cache line accesses to a given page of memory based on the data representing the tracked number of cache line accesses.

5. The data processing system of claim 4 wherein the host processor is operative to move the page to a faster memory based on the spike indication data and wherein the hardware control logic is operative to track the number of cache line accesses by updating a cache directory with data representing the tracked number of cache line accesses, and produce the spike indication data based on the data representing the tracked number of cache line accesses.

6. The data processing system of claim 4 wherein the hardware control logic is operative to:

determine if the count of read and write accesses since the last movement of data from the page probe filter entry exceeds a desired amount and if so then recording a current time stamp of the event and reporting the event to the log;

report a second current time stamp when the count over the defined time period goes back below the desired amount; and in response to reaching a predetermined access threshold, report a number of reads and writes issued since the last movement of data from the page probe filter entry to the log.

7. The data processing system of claim 4 comprising a memory scheduler and wherein the hardware control logic is operative to report the spike for the memory scheduler as a high priority notification in the scalable data fabric.

8. The data processing system of claim 7 wherein the hardware control logic is operative to coalesce records of spikes corresponding to multiple pages.

9. The data processing system of claim 4 wherein the hardware control logic comprises configuration registers and wherein the host processor is operative to set one or more configuration registers with data representing at least one of:

a threshold cache line read accesses rate that constitutes a memory usage spike;

a threshold cache line write access rate that constitutes a memory usage spike;

a threshold for a length of time that cache line accesses have to continually spike;

a pointer to log that contains spike indication data; and enabling a spike detection mode.

10. The data processing system of claim 4 the host processor is operative to move the page to a faster memory based on the data representing the tracked number of cache line access requests exceeding or equating to the threshold comprises determining, by a memory scheduler, which pages are getting high access as required by one or more workloads and moving the determined high access pages to a faster cache for access by the one or more workloads.

11. A method for monitoring memory access traffic in a data processing system comprising:

tracking, by data fabric hardware control logic configured in a data fabric, a number of cache line accesses to a page of main memory associated with one or more data fabric attached remote memory devices by updating a cache directory with data representing the tracked number of cache line accesses to the one or more data fabric remote memory devices; and producing, by the hardware control logic configured in the data fabric, spike indication data, that is accessible by a memory scheduler, that indicates a spike in cache line accesses to a given page of main memory based on the data representing the tracked number of cache line accesses.

12. The method of claim 11 comprising moving the page to a faster memory based on the spike indication data, and wherein tracking the number of cache line accesses comprises updating a cache directory with data representing the tracked number of cache line accesses, and wherein producing the spike indication data is based on the data representing the tracked number of cache line accesses.

13. The method of claim 11 comprising:

comparing, by the hardware control logic, the data representing the tracked number of cache line accesses with a threshold indicating a number of cache line access counts signifying the spike in cache line accesses to a given page within a period of time; and wherein producing the spike indication data comprises notifying the memory scheduler of a spike event.

14. The method of claim 13 wherein notifying the memory scheduler comprises writing the spike indication data to a log accessible by the memory scheduler.

15. The method of claim 13 comprising determining, by a memory scheduler, which pages are getting high access as required by one or more workloads and moving the determined high access pages to a faster memory for access by the one or more workloads.

16. The method of claim 11 wherein the data representing the tracked number of cache line accesses comprises a count of read accesses and a count of write accesses issued to cache lines within a page of main memory: since a movement of data from the page probe filter entry to a log and over a defined time period to detect access spikes.

17. The method of claim 16 comprising:

determining, by the hardware control logic, if the count of read and write accesses since the last movement of data from the page probe filter entry to a log exceeds a desired amount and if so, recording a current time stamp of the event and reporting the event to the log;

reporting, by the hardware control logic, a second current time stamp when the count over the defined time period goes back below the desired amount; and in response to reaching a predetermined access threshold, reporting a number of reads and writes issued since a last reporting of the spike indication data page probe filter entry to the log.

18. The method of claim 11 comprising reporting the spike for a memory scheduler as a high priority notification in a scalable data fabric.

19. The method of claim 18 wherein reporting the spike for the memory scheduler comprises coalescing records of spikes corresponding to multiple pages.

20. The method of claim 11 comprising setting one or more configuration registers with data representing at least one of:

a threshold cache line read access rate that constitutes a memory usage spike;

a threshold cache line write access rate that constitutes a memory usage spike;

a threshold for a length of time that cache line accesses have to continually spike;

a pointer to log that contains spike indication data; and enabling a spike detection mode.

* * * * *